(12) United States Patent
Clover et al.

(10) Patent No.: US 8,141,909 B2
(45) Date of Patent: Mar. 27, 2012

(54) UMBILICAL FIELD CONNECT (75) Inventors: Brett Clover, Grand Bay, AL (US); Jeff Lami, Mobile, AL (US); Spencer Powell, Mobile, AL (US); Maurus Kresse, Mobile, AL (US); Heith Little, Daphne, AL (US)

(73) Assignee: Aker Subsea Inc., Houston, TX (US)

( * ) Notice: Subject to any disclaimer, the term of this patent is extended or adjusted under 35 U.S.C. 154(b) by 518 days.

(21) Appl. No.: 12/404,785

(22) Filed: Mar. 16, 2009

(65) Prior Publication Data
US 2010/0038899 A1 Feb. 18, 2010

Related U.S. Application Data (60) Provisional application No. 61/088,107, filed on Aug. 12, 2008.

(51) Int. Cl.
*F16L 39/00* (2006.01)
(52) U.S. Cl. ...................... 285/124.3; 166/363
(58) Field of Classification Search .............. 285/120.1, 285/124.3, 913, 914; 166/363
See application file for complete search history.

(56) References Cited

U.S. PATENT DOCUMENTS

| | | | |
|---|---|---|---|
| 4,653,776 A | 3/1987 | Borg | |
| 5,458,691 A | 10/1995 | Daniels | |
| 5,655,794 A * | 8/1997 | Sell | 285/124.1 |
| 6,397,948 B1 | 6/2002 | Williams et al. | |
| 6,503,021 B2 | 1/2003 | Corbetta | |
| 7,112,009 B2 | 9/2006 | MacKinnon | |
| 2006/0005971 A1 | 1/2006 | Smith | |

OTHER PUBLICATIONS

International Search Report dated Jun. 24, 2009 from related application No. PCT/US09/041801.

* cited by examiner

*Primary Examiner* — Aaron Dunwoody
(74) *Attorney, Agent, or Firm* — Parsons Behle & Latimer

(57) ABSTRACT

An umbilical field connect assembly comprising: a first umbilical portion comprising two or more first bundled members chosen from electrical cables, fluid conduits, and optical fibers; a second umbilical portion comprising two or more second bundled members chosen from electrical cables, fluid conduits, and optical fibers; a first housing assembly having a first end coupled to the first umbilical portion and a second end comprising a first coupling plate having a plurality of first couplings chosen from male and female couplings positioned therein, one of the plurality of first couplings being positioned at an end of each of the first bundled members; a second housing assembly having a third end coupled to the second umbilical portion and a fourth end comprising a second coupling plate having a plurality of second couplings chosen from male and female couplings positioned therein, one of the second couplings being positioned at an end of each of the second bundled members. The first housing and the second housing can be positioned so that each of the first couplings join with one of the second couplings to form mated coupling pairs, whereby the first bundled members of the first umbilical portion and the second bundled members of the second umbilical portion can be joined in a manner that effectively provides for a single functioning umbilical assembly.

23 Claims, 9 Drawing Sheets

Prior Art

UMBILICAL FIELD CONNECT

The present disclosure claims priority to U.S. Provisional Application No. 61/088,107, filed on Aug. 12, 2008, the disclosure of which is hereby incorporated by reference in its entirety.

BACKGROUND OF THE DISCLOSURE

1. Field of the Disclosure

The present disclosure relates generally to umbilicals employed in subsea development projects, and more specifically, to a solution for connecting an umbilical to another device, such as a second umbilical or an umbilical termination assembly.

2. Description of the Related Art

Subsea oil and gas fields often employ subsea well equipment that is located on the seabed and tied back to a surface structure, such as a production facility and/or ship. An umbilical is often used to convey fluids and/or send electrical and other communication signals between the surface structure and the subsea well equipment. The umbilical can be many miles long with large and heavy end terminations, making it difficult to handle and/or deploy.

Over time, the length and weight of umbilicals has continued to increase. As a result of the increased size, the transportation and installation of the umbilicals is becoming more and more difficult. For example, in some cases it may be difficult to locate an available sea-going vessel that has the capacity to ship and install a very large umbilical.

A known solution for handling a very long umbilical includes cutting the umbilical and installing a subsea umbilical termination assembly ("SUTA") on one end and a Cobra Head on the other end. The connections between each end of the umbilical and the SUTA and Cobra Head are generally made in the factory by, for example, welding. The two umbilical segments with the attached SUTA and Cobra Head can then be separately transported to the deployment site and connected. This approach has a number of disadvantages, including that the on-site connection of the two segments of the umbilical with a SUTA and Cobra Head is performed below the surface of the ocean using an ROV. Furthermore, the SUTA and Cobra Head equipment is costly and often requires several months to manufacture.

Figure 1:
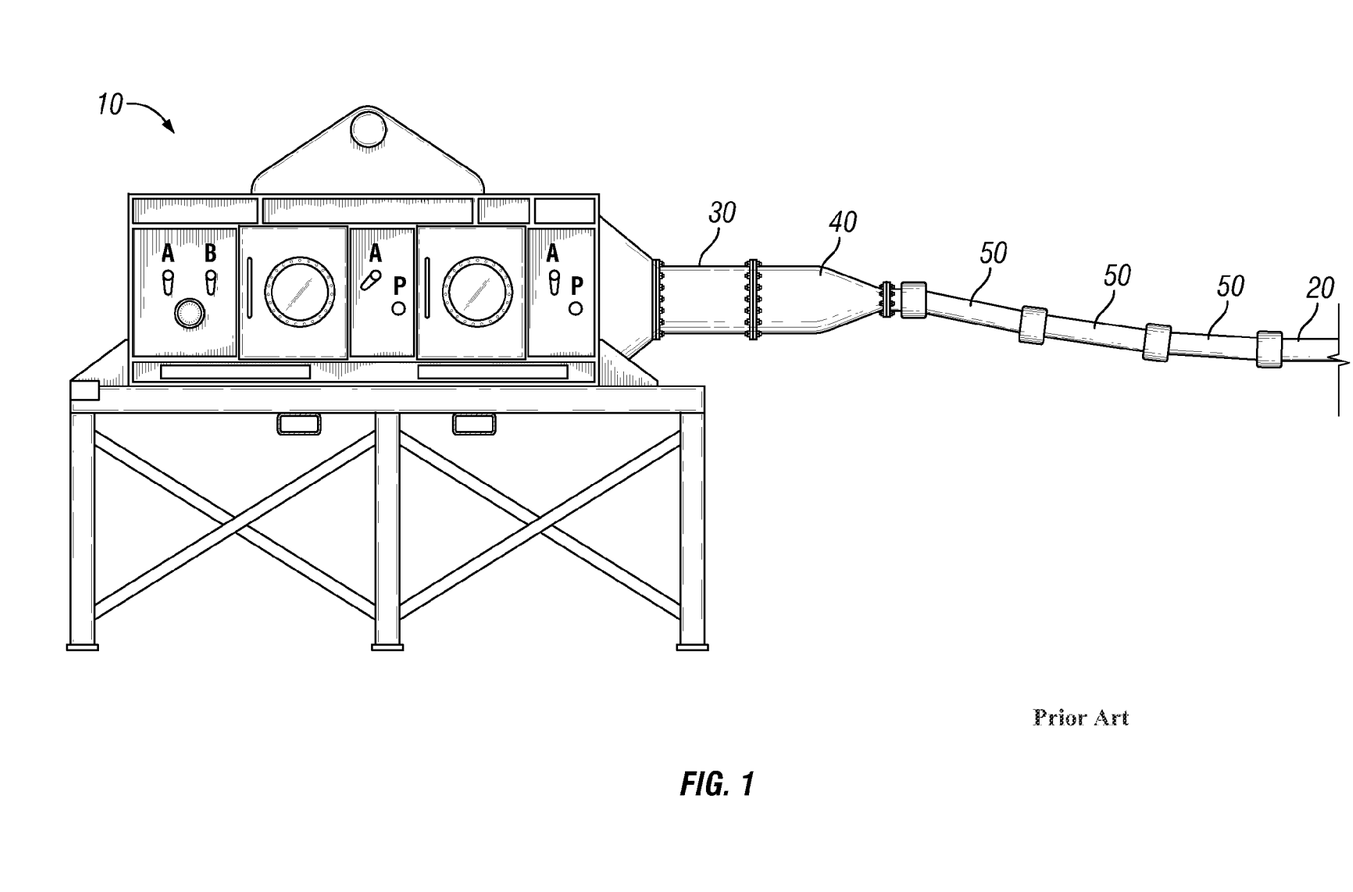
FIG. 1 illustrates an example of a SUTA connected to an umbilical.

FIG. 1 illustrates an example of a SUTA 10 connected to an umbilical 20. SUTA 10 can be relatively large, often weighing several thousand pounds. It is known to connect the umbilical 20 and SUTA 10 using a connection assembly comprising a split barrel 30, an armor pot assembly 40, and one or more bend restrictor clamps 50, all of which can be bolted together. Because of the size and weight of the SUTA, packing and handling during transportation and deployment of the umbilicals can be difficult. Additionally, the connection between the umbilical and SUTA can potentially be a weak point during transportation of the unit to the deployment site. Consequently, damage can occur at the connection, which can result in the need for costly repairs.

The present disclosure is directed to overcoming, or at least reducing the effects of, one or more of the issues set forth above.

SUMMARY OF THE DISCLOSURE

An embodiment of the present disclosure is directed to an umbilical field connect assembly. The umbilical field connect assembly comprises: a first umbilical portion comprising two or more first bundled members chosen from electrical cables, fluid conduits, and optical fibers; a second umbilical portion comprising two or more second bundled members chosen from electrical cables, fluid conduits, and optical fibers; a first housing assembly having a first end coupled to the first umbilical portion and a second end comprising a first coupling plate having a plurality of first couplings chosen from male and female couplings positioned therein, one of the plurality of first couplings being positioned at an end of each of the first bundled members; a second housing assembly having a third end coupled to the second umbilical portion and a fourth end comprising a second coupling plate having a plurality of second couplings chosen from male and female couplings positioned therein, one of the second couplings being positioned at an end of each of the second bundled members. The first housing and the second housing can be positioned so that each of the first couplings join with one of the second couplings to form mated coupling pairs, whereby the first bundled members of the first umbilical portion and the second bundled members of the second umbilical portion can be joined in a manner that effectively provides for a single functioning umbilical assembly.

Another embodiment of the present disclosure is directed to a field connect for an umbilical termination assembly. The field connect comprises an umbilical comprising two or more bundled members chosen from electrical cables, fluid conduits and optical fibers; an umbilical termination assembly (UTA) comprising two or more members chosen from electrical cables, fluid conduits; and optical fibers; a first housing assembly having a first end coupled to the umbilical and a second end comprising a first coupling plate having a plurality of first couplings positioned therein, one of the plurality of first couplings being positioned at an end of each of the first bundled members; a second housing assembly having a third end coupled to the UTA and a fourth end comprising a second coupling plate having a plurality of second couplings positioned therein, the second couplings being positioned at an end of each of the second bundled members. The first housing and the second housing can be positioned so that each of the first couplings join with one of the second couplings to form mated coupling pairs, whereby the first bundled members of the first umbilical portion and the members of the UTA are joined in a manner that effectively provides for a functioning connection between the umbilical and the UTA.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

Figures 2, 3:
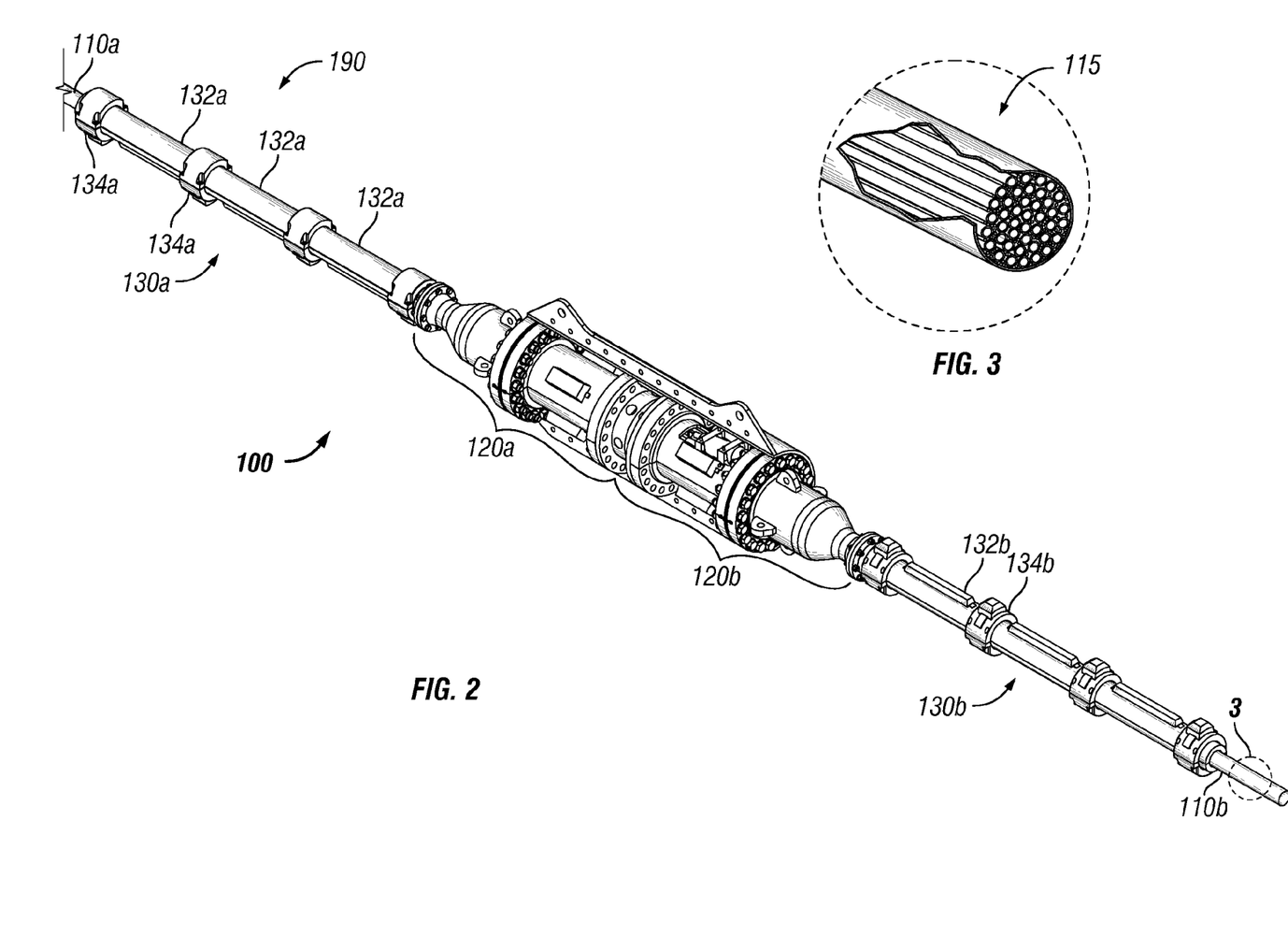
FIG. 2 illustrates an umbilical field connect assembly, according to an embodiment of the present disclosure.
FIG. 3 illustrates a portion of an umbilical having two or more bundled members.

FIG. 2 illustrates an umbilical field connect assembly 100 according to an embodiment of the present disclosure. Umbilical field connect assembly 100 includes a first umbilical portion 110a and a second umbilical portion 110b. An umbilical portion 110 can include two or more bundled members 115, similarly as illustrated in FIG. 3. Bundled members 115 can be chosen from fluid conduits, such as hydraulic lines and tubes for carrying fluids, such as oil or gas; and electrical cables and/or optical fibers for carrying electrical or optical signals for controlling or otherwise communicating with, for example, the subsea well equipment. Umbilicals can extend between a surface structure or ship and subsea well equipment, as is well known in the art.

Figure 4:
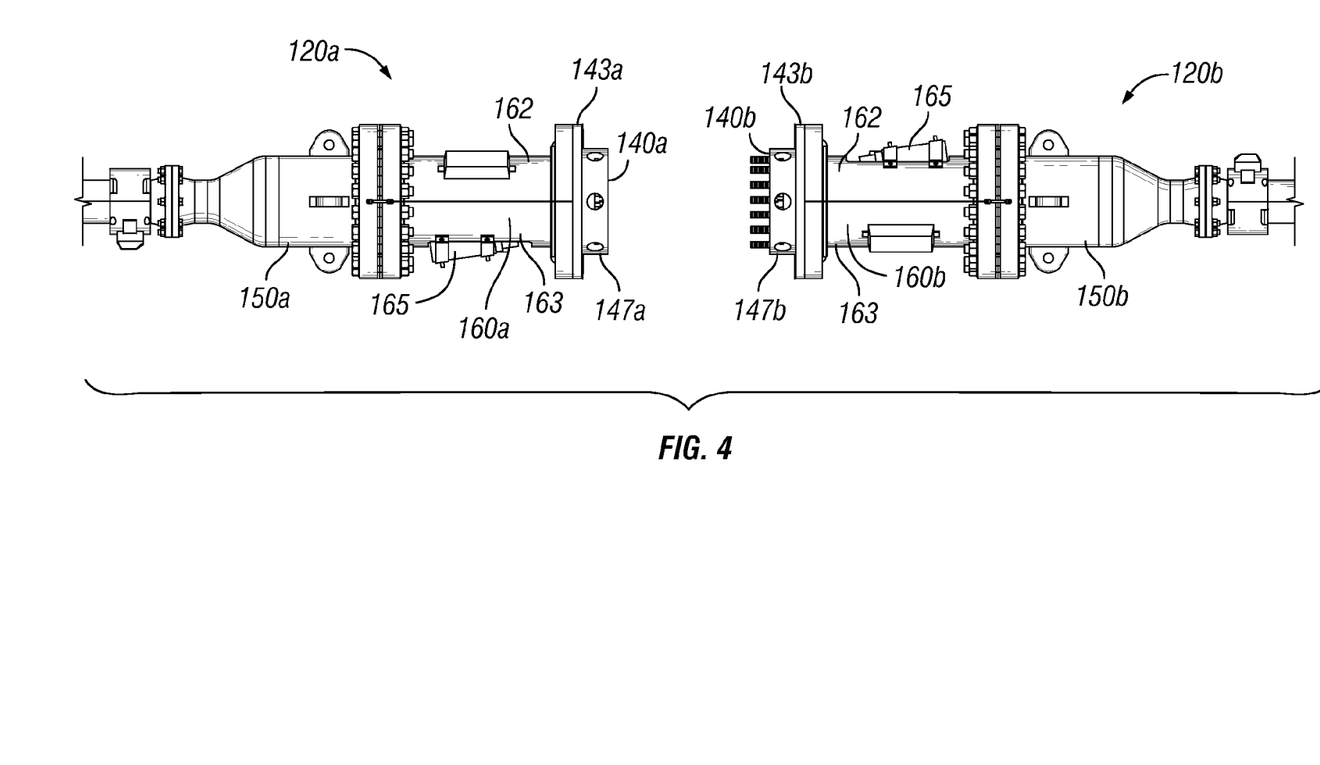
FIG. 4 illustrates first and second housing assemblies prior to coupling, according to an embodiment of the present disclosure.

Referring again to FIG. 2, umbilical field connect assembly 100 includes a first housing assembly 120a and a second housing assembly 120b, which are shown coupled together. FIG. 4 illustrates the first and second housing assemblies prior to coupling. The first housing assembly has a first end coupled to the first umbilical portion 110a. A bend restrictor assembly 130a comprising one or more bend restrictor segments 132a and bend restrictor clamps 134a can be employed. Bend restrictor assembly 130a is positioned proximate the first housing assembly 120a to prevent overbending of the umbilical adjacent to the field connect assembly 100.

Figure 5:
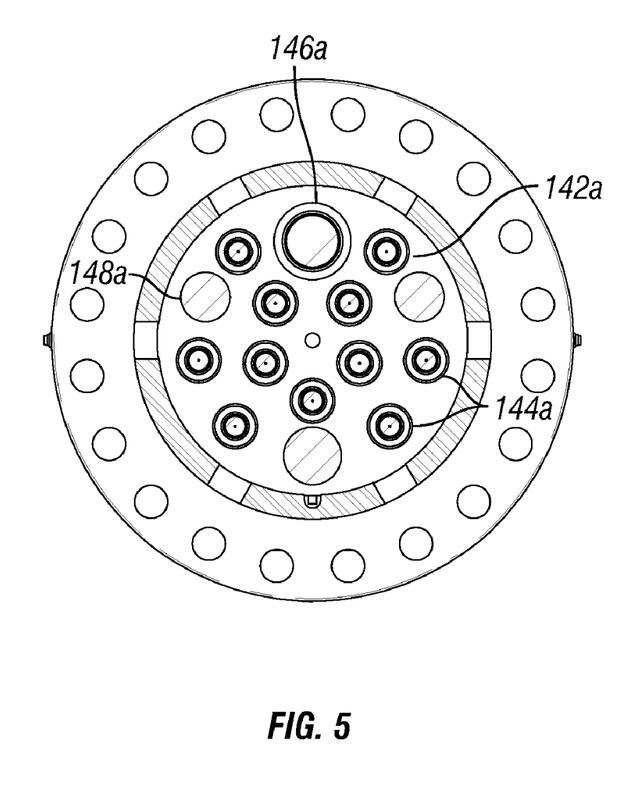
FIG. 5 illustrates a coupling plate having a plurality of female couplings and guide pins holes positioned therein, according to an embodiment of the present disclosure.
Figure 7:
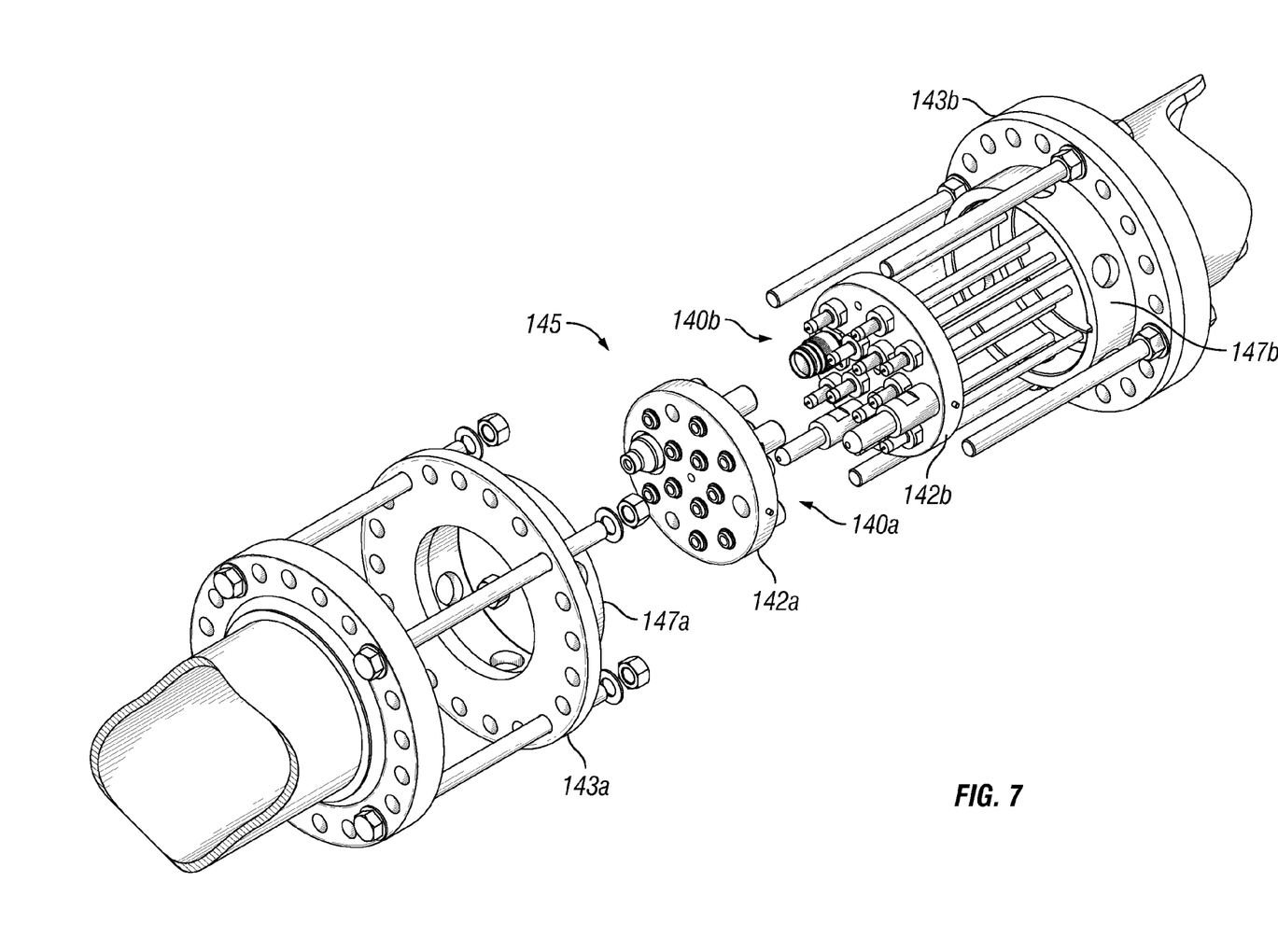
FIG. 7 illustrates an exploded view of a coupler assembly, according to an embodiment of the present application.

As shown in FIG. 4, first housing assembly 120a has a second end 140a, the details of which are more clearly shown in FIGS. 5 and 7. Second end 140a includes a first coupling plate 142a (See FIG. 5) having a plurality of female couplings 144a and 146a and guide pin holes 148a that are positioned therein. Generally one of the plurality of female couplings is positioned at an end of each of the first bundled members 115 (See FIG. 3) of the umbilical portion 110a.

Referring back to FIG. 2, second housing assembly 120b has a third end coupled to the second umbilical portion 110b. Similarly as described above for umbilical portion 110a, a bend restrictor assembly 130b comprising one or more bend restrictor segments 132b and bend restrictor clamps 134b can be employed proximate the second housing assembly 120b.

Figure 6:
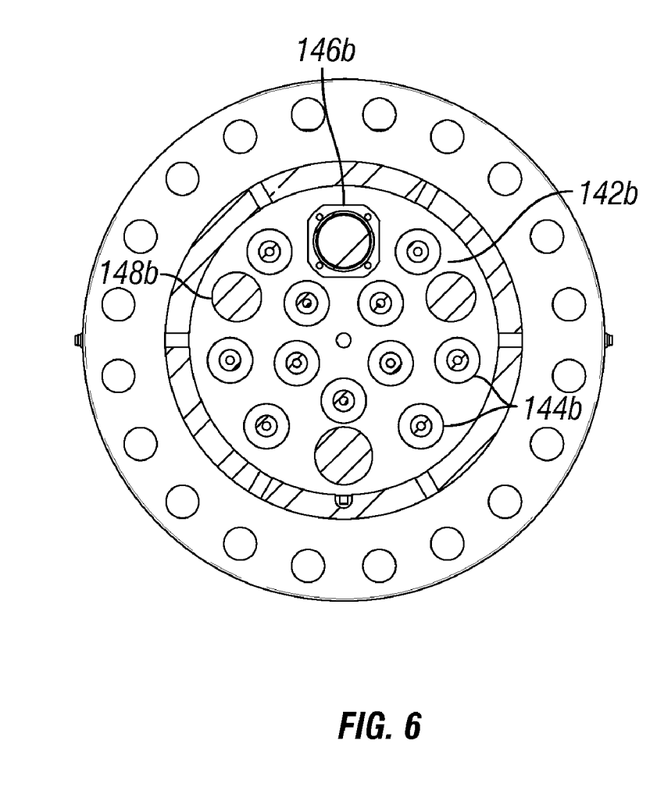
FIG. 6 illustrates a coupling plate having a plurality of male couplings and guide pins positioned therein, according to an embodiment of the present disclosure.

Second housing assembly 120b has a fourth end 140b, the details of which are more clearly shown in FIGS. 6 and 7. The fourth end includes a coupling plate 142b (See FIG. 6) having a plurality of male couplings 144b and 146b and guide pins 148b that are positioned therein. Generally one of the plurality of male couplings is positioned at an end of each of the first bundled members 115 (See FIG. 3) of the umbilical portion 110b. Any suitable type of female couplings and male couplings can be employed. Examples of such couplings are well known in the art. The female couplings 144a and 146a and the guide pin holes 148a of first housing assembly 120a can be respectively aligned with the male couplings 144b and 146b and guide pins 148b of second housing assembly 120b. The first and second housing assemblies 120a and 120b can then be positioned adjacent each other so that the male couplings are received by the female couplings. In this manner, the bundled members 115 of the first umbilical portion 110a and the bundled members 115 of the second umbilical portion 110b can be joined in a manner that effectively provides for a single functioning umbilical assembly 190. The guide pin holes 148a and guide pins 148b function to align coupler plates 142a and 142b and to prevent the two coupler plates from encroaching on a minimum gap allowance between the female couplings and the male couplings.

In the embodiment illustrated in FIGS. 4 to 6, the first housing assembly 120a includes female couplings and the second housing assembly 120b includes male couplings. In other embodiments, the first housing assembly 120a can include a plurality of couplings, including one or more each of both male and female couplings. Similarly, the second housing assembly 120b can also include a plurality of couplings including one or more each of both male and female couplings, each of which corresponds to a mating coupling in the first housing assembly 120a. Any arrangement of male and/or female couplings can be employed that will effectively join the bundled members of the first and second housing assemblies.

Figure 8:
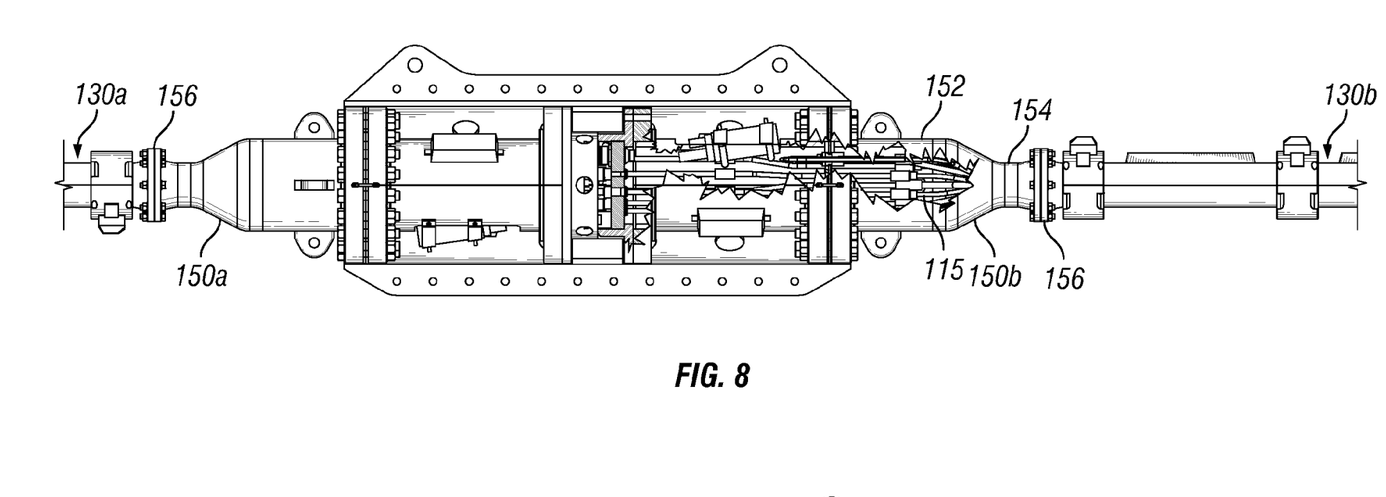
FIG. 8 illustrates an umbilical field connect assembly, according to an embodiment of the present disclosure.

The first and second housing assemblies will now be described in greater detail. As illustrated in FIG. 4, housing assemblies 120a and 120b can include armor pots 150a and 150b, respectively. Armor pots are well known in the art, and can include an outer casing 152 through which bundled members 115 extend, as illustrated in FIG. 8. The armor pot can include a casting resin, or potting resin, (not shown) inside the outer casing 152. The casting resin forms a resin matrix that can function to connect the armor pot to the umbilical, holding the bundled members of the umbilical in place so that they are not pulled out from the umbilical when force is applied to the field connect assembly 100. Armor pots 150a and 150b can also be connected to the bend restrictor assemblies 130 via a flange assembly 156 (See FIG. 8). Any other suitable means for making the connection, such as welding, can also be employed in place of or in addition to the flange assembly 156.

Referring again to FIG. 4, armor pots 150a and 150b are also connected to split barrel assemblies 160a and 160b, respectively. The connection between the armor pots and the split barrel assemblies can be made in any suitable manner, including using a flange assembly, a latching mechanism and/or by welding.

The outer casings of split barrel assemblies 160a and 160b include two halves 162 and 163. The outer casing half 162 and/or the outer casing half 163 can each be separately removed to allow easy access to the bundled members 115 that are illustrated in FIG. 8.

Split barrel assembly 160a and/or split barrel assembly 160b can include an electrical termination 165. Such electrical terminations are well known in the art for connecting electrical cables generally. In the present disclosure, electrical termination 165 allows for two or more electrical cables from the umbilical portions 110a and 110b to be connected in the field connect assembly 100 using a single male electrical coupling 146b and female electrical coupling 146a (See FIG. 6). Multiple electrical terminations 165 can be employed in a split barrel assembly, depending upon the number of electrical cables to be connected. Employing such electrical terminations can reduce the complexity and size requirements of the field connect assembly 100.

Referring again to FIG. 4, the first split barrel assembly 160a and the second split barrel assembly 160b are respectively connected to coupling plate seating flanges 143a and 143b. The connections can be made in any suitable manner, such as by bolting, welding or by other means. As is more clearly illustrated in the exploded view of the coupler assembly 145 of FIG. 7, coupling plates 142a and 142b are positioned in coupling plate seatings 147a and 147b to form the mating ends 140a and 140b of the field connect assembly 100.

First housing assembly 120a and second housing assembly 120b can be fastened together in any suitable manner so that the female couplings 144a and 146a and guide pin holes 148a of the first coupling plate 142a and the male couplings 144b and 146b and guide pins 148b of the second coupling plate 142b are held together between the first coupling plate seating flange 143a and the second coupling plate seating flange 143b. In an embodiment, the first and second housing assemblies can be fastened using a technique that allows for easy decoupling of the housing assemblies. For example, the first split barrel assembly can be bolted to the second split barrel assembly, or the first and second split barrel assemblies can be fastened using a quick locking means. In other embodiments, the first and second housing assemblies can be permanently fastened together, such as by welding or any other suitable means.

Figure 9:
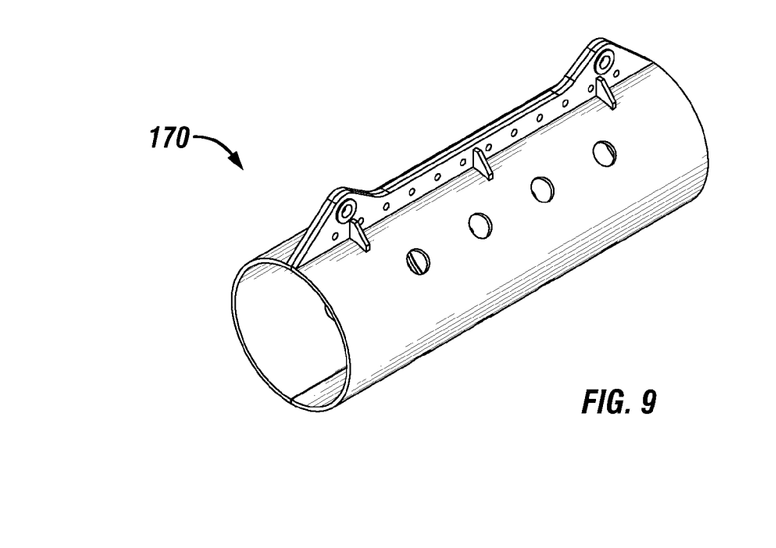
FIG. 9 illustrates a split clamp casing assembly, according to an embodiment of the present disclosure.

In an embodiment, a split clamp casing assembly 170, illustrated in FIG. 9, is fastened around the first and second housing assemblies 120a and 120b of FIG. 2. This can provide additional protection and support to the field connect assembly 100. In an embodiment, split clamp casing assembly 170 is bolted together to form a casing around the first split barrel assembly 160a, the coupler assembly 145 and the second split barrel assembly 160b. The split clamp casing assembly 170 may provide a suitable lifting point for the field connect assembly 100.

Figure 10:
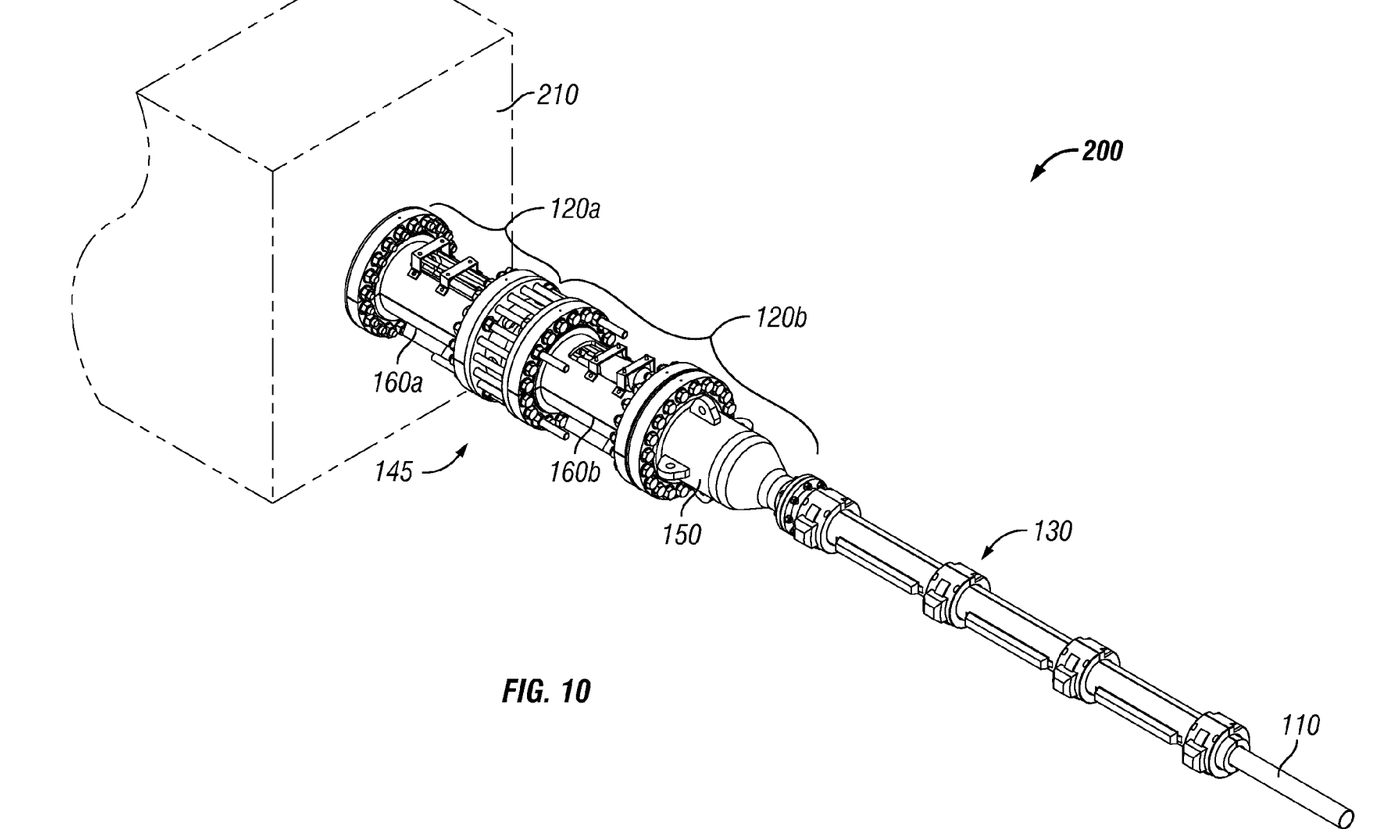
FIGS. 10 and 11 illustrate a field connect assembly for an umbilical termination assembly, according to an embodiment of the present disclosure.
Figure 11:
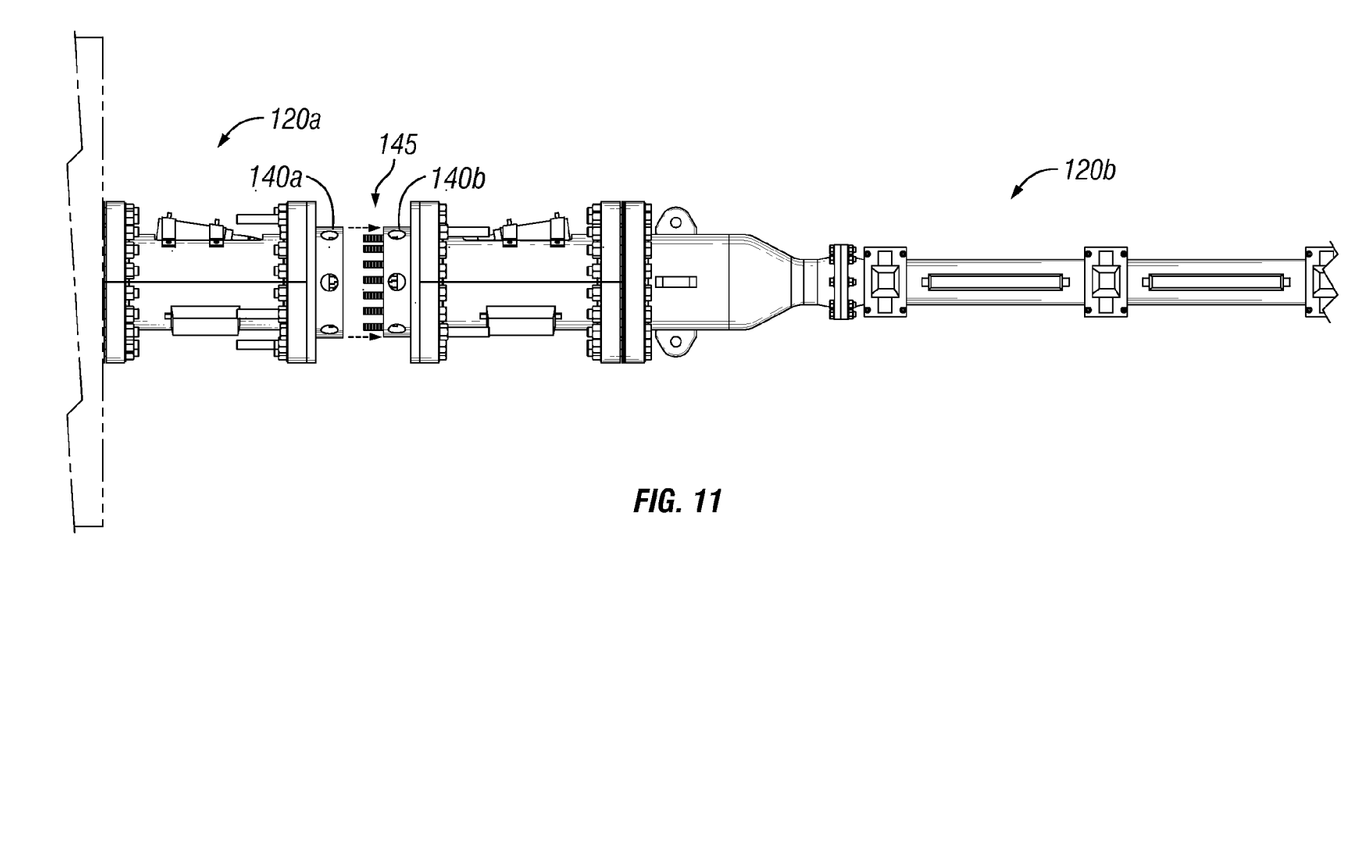

FIGS. 10 and 11 illustrate a field connect assembly 200 for an umbilical termination assembly, according to another embodiment of the present disclosure. The field connect assembly 200 is similar to the field connect assembly 100, described above, except that field connect 200 is designed for connection to an umbilical termination assembly ("UTA") 210. Umbilical termination assembly 210 may be any device, other than an umbilical, into which an umbilical may be connected, including a subsea umbilical termination assembly ("SUTA"). Such UTAs and SUTAs are well known in the art.

The field connect assembly 200 comprises housing assemblies 120a and 120b. Housing assembly 120b has a first end coupled to an umbilical 110 and includes an armor pot 150 and a split barrel assembly 160b, similarly as described above for housings 120a and 120b in the drawings of FIGS. 2 to 9. A bend restrictor assembly 130 can also be employed similarly as described above.

The housing 120a of FIG. 10 can have any suitable design or structure that would provide for acceptable coupling to UTA 210 and housing assembly 120b. In an embodiment, housing assembly 120a comprises a split barrel assembly 160a coupled directly to UTA 210. The split barrel assembly 160a can be similar to the split barrel assemblies discussed herein above. The UTA can include two or more members 115 chosen from electrical cables, fluid conduits and optical fibers, which extend through split barrel assembly 160a, similarly as shown in FIG. 8 above.

A coupling assembly 145, similar to that shown in FIG. 7, can be used to join the housing assemblies 120a and 120b of FIGS. 10 and 11. Female couplings 144a, 146a and guide pin holes 148a and male couplings 144b, 146b and guide pines 148b, as illustrated in FIGS. 5 and 6, can be interchangeably used as part of either of housings 120a or 120b of FIGS. 10 and 11, so as to provide a functioning coupling assembly 145. In an embodiment, a plurality of couplings, including one or more each of both male and female couplings, can be employed in the housings 120a, with corresponding mating couplings being employed in housing 120b.

In an embodiment, a split clamp casing assembly 170, as illustrated in FIG. 9, is fastened around the first and second housing assemblies 120a and 120b of FIG. 10. This can provide additional protection and support to the field connect assembly 200. For example, split clamp casing assembly 170 can be bolted together to form a casing around the first split barrel assembly 160a, the coupler assembly 145 and the second split barrel assembly 160b.

Figure 12:
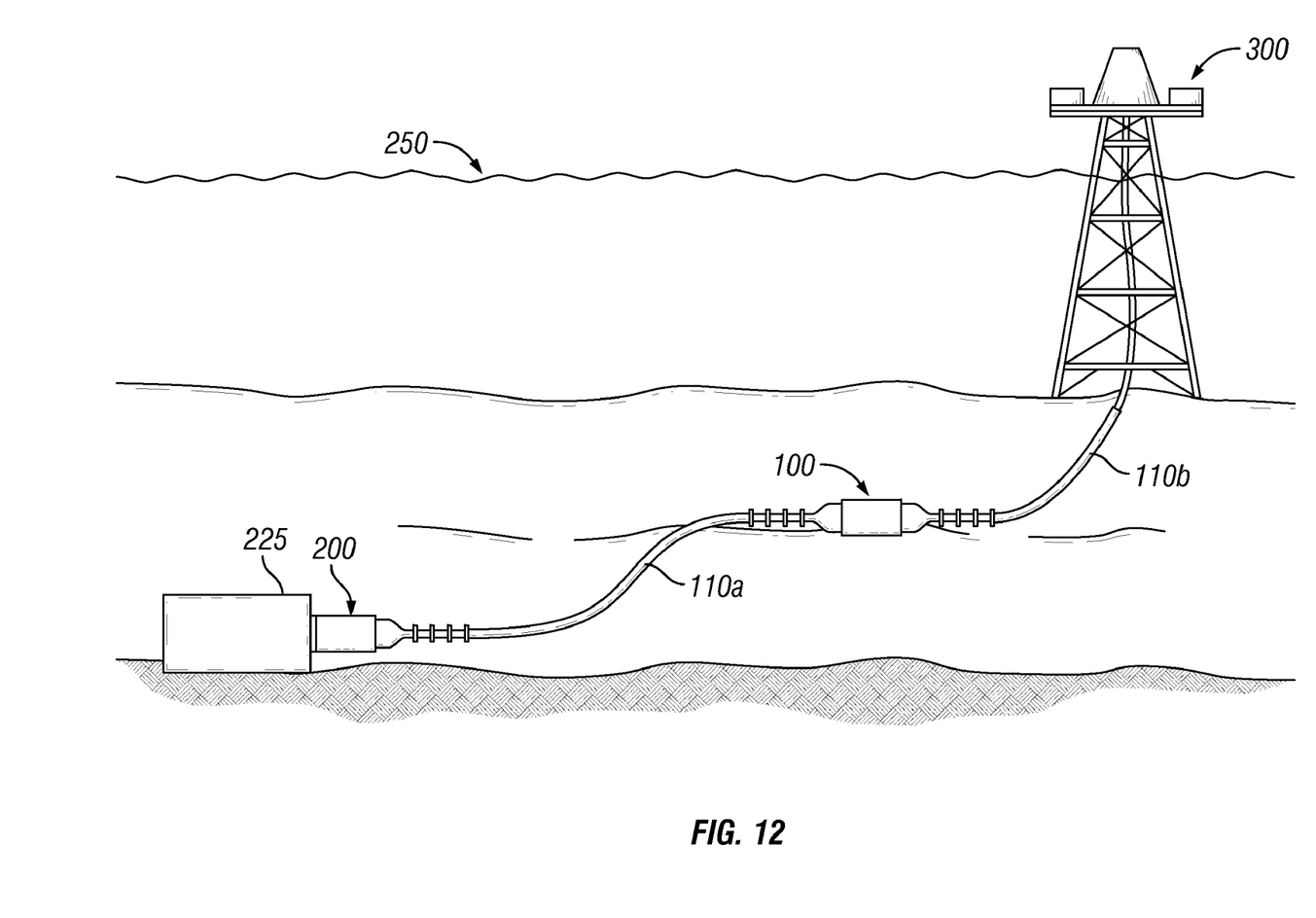
FIG. 12 illustrates a subsea well assembly, according to an embodiment of the present disclosure.

FIG. 12 illustrates a subsea well assembly 250, according to an embodiment of the present application. The subsea well assembly 250 can comprise, among other things, a subsea well device 225, such as, for example, a SUTA, positioned below the surface of the ocean. In an embodiment, an umbilical 110 can be connected to the subsea well device using a field connect assembly 200, as described herein above. In an embodiment, an umbilical 110 can be connected to the subsea well device 225, wherein the umbilical 110 comprises a plurality of umbilical portions 110a, 110b coupled together using the field connect assembly 100, as described herein above.

Although various embodiments have been shown and described, the present disclosure is not so limited and will be understood to include all such modifications and variations as would be apparent to one skilled in the art.

What is claimed is:

1. A subsea umbilical field connect assembly comprising:
  a first subsea umbilical portion comprising two or more first bundled members chosen from electrical cables, fluid conduits, and optical fibers;
  a second subsea umbilical portion comprising two or more second bundled members chosen from electrical cables, fluid conduits, and optical fibers;
  a first housing assembly having a first end coupled to the first subsea umbilical portion and a second end comprising a first coupling plate having a plurality of first couplings chosen from male and female couplings positioned therein, one of the plurality of first couplings being positioned at an end of each of the first bundled members;
  a second housing assembly having a third end coupled to the second subsea umbilical portion and a fourth end comprising a second coupling plate having a plurality of second couplings chosen from male and female couplings positioned therein, one of the second couplings being positioned at an end of each of the second bundled members;
  wherein the first housing and the second housing can be positioned so that each of the first couplings join with one of the second couplings to form mated coupling pairs, whereby the first bundled members of the first umbilical portion and the second bundled members of the second umbilical portion can be joined in a manner that effectively provides for a single functioning umbilical assembly.

2. The umbilical field connect of claim 1, wherein the first bundled members and the second bundled members each comprise at least one fluid conduit.

3. The umbilical field connect of claim 1, wherein the first bundled members and the second bundled members each comprise a plurality of fluid conduits.

4. The umbilical field connect of claim 3, wherein the first bundled members and the second bundled members each comprise at least one electrical cable.

5. The umbilical field connect of claim 1, wherein the first housing comprises a first armor pot connected to the first umbilical portion and a first split barrel assembly connected to the first armor pot.

6. The umbilical field connect of claim 5, wherein the first split barrel assembly comprises a flange that is bolted to a first coupling plate seating flange having a coupling plate seat, the coupling plate being positioned in the coupling plate seat.

7. The umbilical field connect of claim 6, wherein the second housing comprises a second armor pot coupled to the second umbilical portion and a second split barrel assembly coupled to the second armor pot.

8. The umbilical field connect of claim 7, wherein the second split barrel assembly comprises a flange that is bolted to a second coupling plate seating flange having a second coupling plate seat, the second coupling plate being positioned in the second coupling plate seat.

9. The umbilical field connect of claim 8, wherein the first split barrel assembly is bolted to the second split barrel assembly so that the first couplings of the first coupling plate and the second couplings of the second coupling plate are held together between the first coupling plate seating flange and the second coupling plate seating flange.

10. The umbilical field connect of claim 9, further comprising a split clamp casing assembly that is bolted together to form a casing around the first split barrel assembly, the coupling assembly and the second split barrel assembly.

11. The umbilical field connect of claim 7, further comprising a first bend restrictor assembly coupled between the first umbilical portion and the first armor pot assembly and a second bend restrictor assembly coupled between the second umbilical portion and the second armor pot assembly.

12. A field connect for an umbilical termination assembly, the field connect comprising:
  a subsea umbilical comprising two or more bundled members chosen from electrical cables, fluid conduits and optical fibers;
  an umbilical termination assembly (UTA) comprising two or more members chosen from electrical cables, fluid conduits; and optical fibers;
  a first housing assembly having a first end coupled to the umbilical and a second end comprising a first coupling plate having a plurality of first couplings positioned therein, one of the plurality of first couplings being positioned at an end of each of the first bundled members;
  a second housing assembly having a third end coupled to the UTA and a fourth end comprising a second coupling plate having a plurality of second couplings positioned therein, the second couplings being positioned at an end of each of the second bundled members;
  wherein the first housing and the second housing can be positioned so that each of the first couplings join with one of the second couplings to form mated coupling pairs, whereby the first bundled members of the first umbilical portion and the members of the UTA are joined in a manner that effectively provides for a functioning connection between the umbilical and the UTA.

13. The field connect of claim 12, wherein the bundled members and the UTA members each comprise at least one fluid conduit.

14. The field connect of claim 12, wherein the bundled members and the UTA members each comprise a plurality of fluid conduits.

15. The field connect of claim 14, wherein the bundled members and the UTA members each comprise at least one electrical cable.

16. The field connect of claim 12, wherein the first housing comprises an armor pot connected to the umbilical and a first split barrel assembly connected to the armor pot.

17. The field connect of claim 16, wherein the first split barrel assembly comprises a flange that is bolted to a first coupling plate seating flange having a coupling plate seat, the coupling plate being positioned in the coupling plate seat.

18. The field connect of claim 17, wherein the second housing comprises a second split barrel assembly coupled to the UTA.

19. The field connect of claim 18, wherein the second split barrel assembly comprises a flange that is bolted to a second coupling plate seating flange having a second coupling plate seat, the second coupling plate being positioned in the second coupling plate seat.

20. The field connect of claim 19, wherein the first split barrel assembly is bolted to the second split barrel assembly so that the first couplings of the first coupling plate and the second couplings of the second coupling plate are held together between the first coupling plate seating flange and the second coupling plate seating flange.

21. The field connect of claim 16, further comprising a bend restrictor assembly coupled to the umbilical between the umbilical and the armor pot assembly.

22. A subsea well assembly comprising:
  a subsea well device positioned below the surface of the ocean; and
  an umbilical connected to the subsea well device using the field connect assembly of claim 12.

23. A subsea well assembly comprising:
  a subsea well device positioned below the surface of the ocean; and
  an umbilical connected to the subsea well device, wherein the umbilical comprises a plurality of umbilical portions coupled together using the field connect assembly of claim 1.

* * * * *